No. 687,624. Patented Nov. 26, 1901.
G. F. HATTON & A. N. WHITEHEAD.
APPARATUS FOR TAKING AND VIEWING OR EXHIBITING CINEMATOGRAPHIC PICTURES.
(Application filed Feb. 13, 1901.)
(No Model.) 8 Sheets—Sheet 1.

Fig. 1.

WITNESSES
F. W. Wright
S. C. Connor

INVENTORS
GEORGE F. HATTON
ALFRED N. WHITEHEAD
BY
Howson and Howson
THEIR ATTORNEYS.

No. 687,624. Patented Nov. 26, 1901.
G. F. HATTON & A. N. WHITEHEAD.
APPARATUS FOR TAKING AND VIEWING OR EXHIBITING CINEMATOGRAPHIC PICTURES.
(Application filed Feb. 13, 1901.)

(No Model.) 8 Sheets—Sheet 2.

WITNESSES
F. W. Wright
S. C. Connor

INVENTORS
GEORGE F. HATTON
ALFRED N. WHITEHEAD
BY Howson and Howson
THEIR ATTORNEYS.

No. 687,624. Patented Nov. 26, 1901.
G. F. HATTON & A. N. WHITEHEAD.
APPARATUS FOR TAKING AND VIEWING OR EXHIBITING CINEMATOGRAPHIC PICTURES.
(Application filed Feb. 13, 1901.)

(No Model.) 8 Sheets—Sheet 3.

WITNESSES:

INVENTORS
GEORGE F. HATTON
ALFRED N. WHITEHEAD
BY
THEIR ATTORNEYS

No. 687,624. Patented Nov. 26, 1901.
G. F. HATTON & A. N. WHITEHEAD.
APPARATUS FOR TAKING AND VIEWING OR EXHIBITING CINEMATOGRAPHIC PICTURES.
(Application filed Feb. 13, 1901.)
(No Model.) 8 Sheets—Sheet 4.

No. 687,624. Patented Nov. 26, 1901.
G. F. HATTON & A. N. WHITEHEAD.
APPARATUS FOR TAKING AND VIEWING OR EXHIBITING CINEMATOGRAPHIC PICTURES.
(Application filed Feb. 13, 1901.)
(No Model.) 8 Sheets—Sheet 6.

WITNESSES
F. W. Wright.
S. C. Connor.

INVENTORS
GEORGE F. HATTON
ALFRED N. WHITEHEAD
BY
Howson and Howson
THEIR ATTORNEYS No. 687,624. Patented Nov. 26, 1901.
G. F. HATTON & A. N. WHITEHEAD.
APPARATUS FOR TAKING AND VIEWING OR EXHIBITING CINEMATOGRAPHIC PICTURES.
(Application filed Feb. 13, 1901.)

(No Model.) 8 Sheets—Sheet 7.

WITNESSES:
F. W. Wright
S. C. Connor

INVENTORS.
GEORGE F. HATTON
ALFRED N. WHITEHEAD
BY
Howson and Howson
HIS ATTORNEYS No. 687,624. Patented Nov. 26, 1901.
G. F. HATTON & A. N. WHITEHEAD.
APPARATUS FOR TAKING AND VIEWING OR EXHIBITING CINEMATOGRAPHIC PICTURES.
(Application filed Feb. 13, 1901.)

(No Model.) 8 Sheets—Sheet 8.

WITNESSES
F. W. Wright
J. C. Curver

INVENTORS
GEORGE F. HATTON
ALFRED N. WHITEHEAD
BY
Howson and Howson
THEIR ATTORNEYS

UNITED STATES PATENT OFFICE.

GEORGE FREDERIC HATTON, OF ST. LEONARDS, AND ALFRED NORTH WHITEHEAD, OF CAMBRIDGE, ENGLAND.

APPARATUS FOR TAKING AND VIEWING OR EXHIBITING CINEMATOGRAPHIC PICTURES.

SPECIFICATION forming part of Letters Patent No. 687,624, dated November 26, 1901.

Application filed February 13, 1901. Serial No. 47,158. (No model.)

*To all whom it may concern:*

Be it known that we, GEORGE FREDERIC HATTON, gentleman, residing at 17 Carisbrooke road, St. Leonards, in the county of Sussex, and ALFRED NORTH WHITEHEAD, lecturer, residing at Trinity college, Cambridge, in the county of Cambridge, England, have invented certain new and useful Improvements in Apparatus for Taking and Viewing or Exhibiting Cinematographic Pictures; and we do hereby declare the following to be a full, clear, and exact description of the invention, such as will enable others skilled in the art to which it appertains to make and use the same.

Our invention relates to apparatus for taking and viewing or exhibiting cinematographic pictures; and it has for its object to make the apparatus more efficient in action and more simple in construction and also more durable than such apparatus as hitherto constructed.

In carrying out our invention we cause a band of pictures prepared from a photographic negative taken by means of our apparatus to pass in a straight or curved path with a regular and continuous motion in one direction, and at a suitable distance from this film we place two mirrors, which are pivoted on a common axis, so that they can be turned through a suitable angle.

We use the expression "mirrors" in this specification and in the claims in a sufficiently general sense to include total-reflection prisms, which obviously can be used as the equivalent of mirrors.

The film or band is illuminated by a lantern containing two lenses or by two separate sources of light, so as to obtain two beams each of parallel or slightly-convergent rays, both of which beams pass through a sufficient part of the film exposed to view and fall on the two mirrors respectively. These two mirrors are mounted so that they can be moved relatively to each other like the leaves of a book, or, as it may be termed, "bookwise." A drum or cylinder having a double series of openings or slits in it, so arranged that they alternately shut off and expose the respective mirrors, is so mounted on an axis that when rotated its wall passes as closely as possible in front of the mirrors and acts as a rotary changer or shutter. The said film, rotary shutter, and mirrors are so operated that when an opening in the said shutter is opposite mirror No. 1 and the band of pictures begins to traverse across mirror No. 1 the said mirror changes its angle, so that the reflected picture appears stationary. When the first picture has traversed a distance equal to about its own breadth, mirror No. 2 is in position, or the apparatus may be arranged so that mirror No. 1 keeps the image of the first picture apparently stationary until the picture has traversed a distance equal to about half its own breadth, the mirror No. 2 being then in position to reflect this first picture in the same direction as mirror No. 1 is doing. During this period the rotary shutter shuts out mirror No. 1 and uncovers mirror No. 2, as already described. Mirror No. 2 now keeps the image of the first picture apparently stationary until the picture has traversed about half of its breadth, mirror No. 1 having meantime been turned back to its starting position. The second picture will now occupy approximately the same position as did the first picture at the start. The rotary shutter now again operates and changes the first picture for the second picture, as already described. When this change is completed, the cycle recommences. The movements of the mirrors upon their common axis we may produce by cams, against which bear arms connected with the mirrors.

In order that the invention may be fully understood, we will describe, with reference to the accompanying drawings, arrangements by which it can be practically performed.

Fig. 2 is a front elevation, Fig. 3 a plan, and Fig. 4 an end elevation, partly in vertical section, on the line 4 4 of Fig. 3, of an apparatus constructed in accordance with our invention to reflect the second picture in the same direction as mirror No. 1 is reflecting the first picture, and during this period the rotary shutter gradually shuts out mirror No. 1 and at the same time gradually and proportionately exposes mirror No. 2 by means of its openings or slits, the end of one slit—say the right-hand one— coinciding with the beginning of the other slit—say the left-hand one. Mirror No. 2 now reflects the second picture and changes its angle to keep the picture apparently stationary until the picture has traversed about its own breadth. The third picture will now occupy the same position, as regards mirror No. 1, as the first picture did at the start, and mirror No. 1 which has meantime been turned back to its starting position, is ready to reflect the third picture. During this period the rotary shutter gradually shuts out mirror No. 2 and proportionately exposes mirror No. 1. When this change is completed, the cycle recommences.

Referring to the diagram illustrated in Fig. 1, the film $a$ moves with uniform velocity, hereinafter referred to as $v$, between two fixed points, (represented by rollers at H and K,) in the direction indicated by the arrow. Two mirrors are arranged to oscillate on the vertical axis O, which is perpendicular to the plane of the diagram, and the line O D (whose length is hereinafter referred to as $d$) bisects the film between H and K at right angles at D. The plane of the figure bisects the height of the mirrors. The straight line $m'\,o\,m^2$ represents the position of the mirrors when they make the image of D in either mirror to be at C', where O C' = O D and the line O L, perpendicular to the line $m'\,o\,m^2$, bisects the angle between the line O D and the line C' O produced. The mirror O M' oscillates around its fixed axis O about the position $o\,m'$ and when in use oscillates, so as to keep the vertical image in it of a moving picture A C B on the film approximately stationary in the position A' C' B'. The mirror O M² similarly oscillates about the position O $m^2$, so as when in use to keep the vertical image of a picture A C B on the film approximately stationary in the same position, A' C' B'. In the diagram O $m^2$ is covered by the shutter S.

The formula regulating the oscillation of either mirror when in use is as follows: (Stated, for example, for the mirror O M':) Let $t$ be the time before the middle point C of the picture reaches D and $\theta$ the angle M' O $m'$ between the position O M' of the mirror and the position O $m'$ corresponding to the instant when C is at D, then tangent $2\theta = vt/d$. The reflected light moving approximately as from A' C' B' falls on an objective consisting of a condensing-lens I and a magnifying-lens (not shown in the diagram) arranged with C' O produced as their optical axis. This objective either throws a real image onto the screen or is arranged for direct vision of a vertical image and can, if desired, be made binocular. The band of film has its successive images in a single line, the two mirrors being pivoted to each other like the leaves of a book and capable of being oscillated with relation to each other as are the leaves of a book. The cams E for oscillating the two mirrors are so constructed and timed with relation to the speed of travel of the film and to the movements of the shutter S that the two shutters are actuated successively, so that one mirror acts upon every other image on the film and the other mirror upon the alternate images. Each mirror is returned to its initial position for every other image and is oscillated to act on and move with that image when the shutter exposes the latter. Such oscillating return movement of a mirror to its initial position takes place while the shutter still covers the advancing image on which that mirror is next to act.

Figure 1:
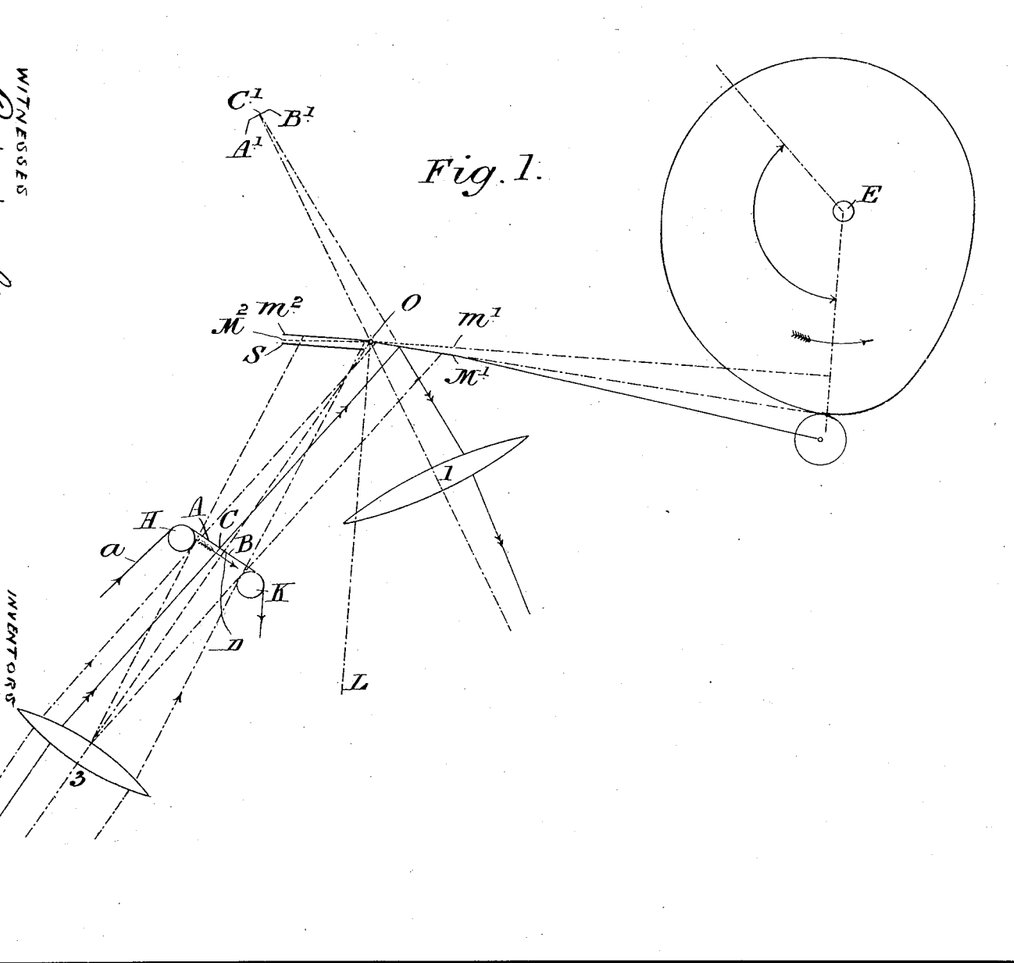
Figure 1 is a diagram illustrating the principle of our invention.

Instead of the apparatus being arranged so that the lines D O and O C' form an angle to each other, as in Fig. 1, the apparatus may, as shown in Figs. 2 to 11, inclusive, be arranged with D O C' of Fig. 1 in a straight line. Then the lantern and film must be slightly below the plane which bisects the mirrors and the lantern be pointed slightly upward, so that the reflected rays pass back over H K, as indicated by the dotted lines in Figs. 4, 7, and 8. The reflected rays from the mirrors may be received either into an objective for projection onto a screen or an eyepiece may be provided, so as to view the vertical image, in which latter case the vision can be made binocular by well-known optical methods.

As shown in Figs. 2 to 11, the two mirrors O M' O M² are mounted (if desired, with means of adjustment) in suitable frames pivoted by screws O to a bracket 5, projecting upward from the base-board 6, or they may in any other desired manner be arranged so as to oscillate about a common vertical axis. The mirror-frames are each provided with a lever-arm $m^3$, which through a spring $m^4$ is caused to bear against one of a pair of disk-cams $n$ or $n'$, mounted on the same shaft $n^2$, adapted to impart the necessary oscillatory motion to the corresponding mirror, the lever-arm being provided with an antifriction-roller where it bears upon the cam. In the modified forms of apparatus illustrated in Figs. 2 to 11 the cams are represented as adapted to operate the mirrors at each third of the revolution; but it will be obvious that the cams can be arranged, as shown in Fig. 1, to operate only once in each rotation, the speed of the cam-shaft being increased relatively to the other moving parts.

Figure 2:
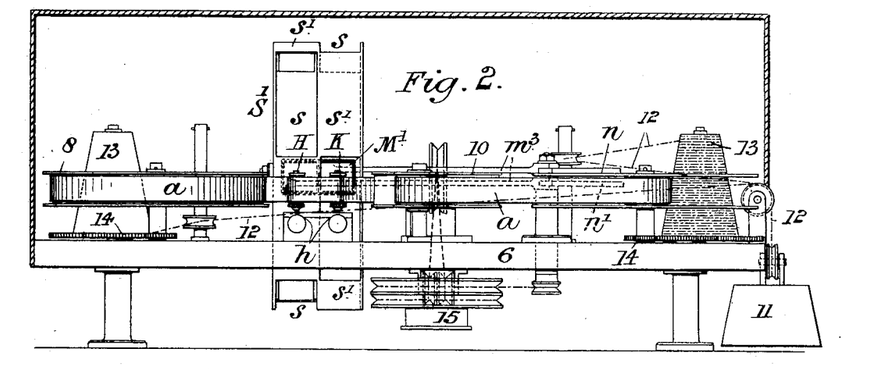
Figure 3:
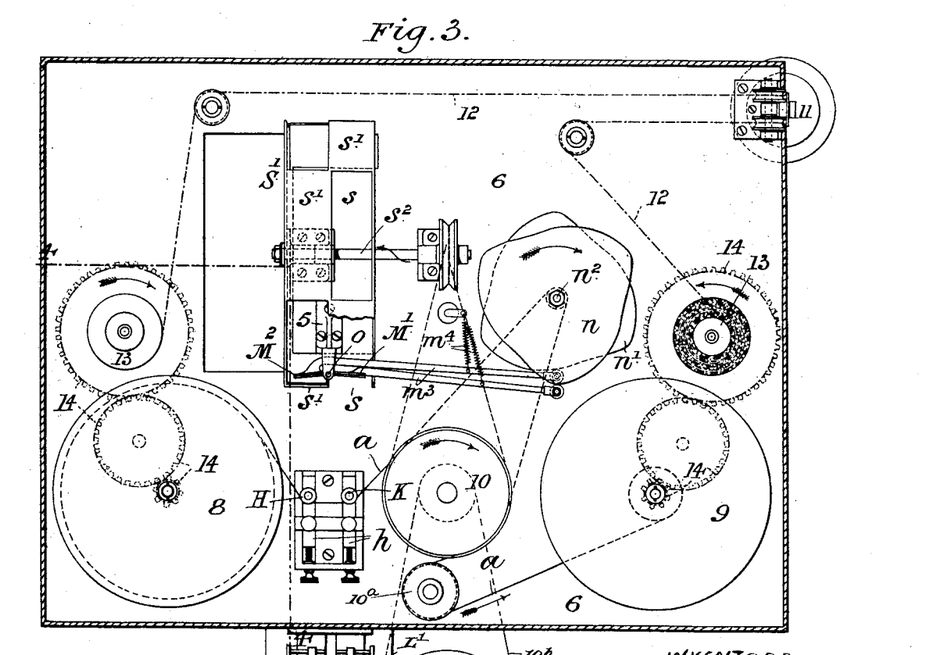
Figure 4:
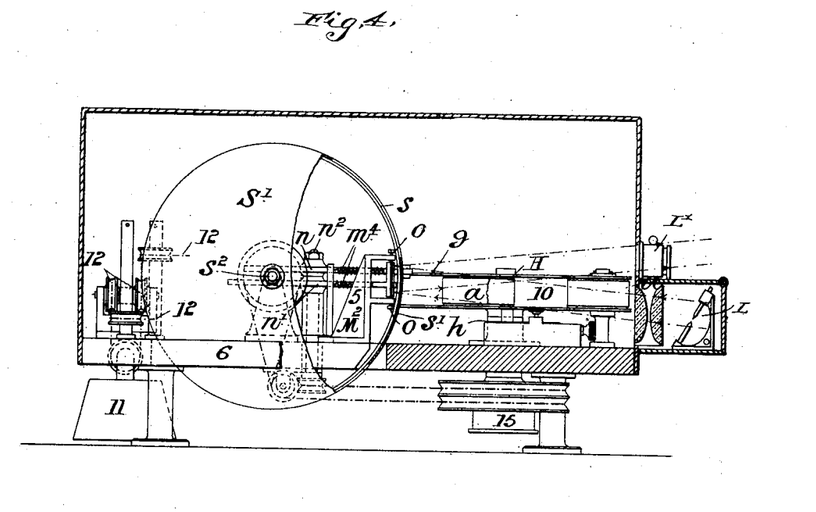

Figs. 2, 3, and 4 illustrate our preferred form of cinematographic apparatus, in which the mirrors M' M² are mounted to oscillate on a pivot O and are operated by arms $m^3$ $m^3$, held against cams $n$ $n'$ on a cam-shaft $n^2$ by a spring $m^4$ or other suitable devices—such, for example, as magnetic means. The mirrors are pivoted in a frame 5, secured to the base of the apparatus. A shutter-wheel S', mounted on a shaft $S^2$, operated by a belt passing around the film-driving pulley 10, is revolved in front of the two mirrors M' M² and is provided with openings $s$ and closures $s'$, alternating in position around its periphery and so adapted that one mirror at a time only shall be exposed to the opening $s$, and that mirror the one in the then-correct position, as hereinbefore described.

The film is drawn from a wheel 8 over adjustable rollers H K in a frame $h$ in a direct line between the source of light L (an arc-lamp in this case) and the oscillating mirrors. The film then passes over the feeding-roller 10, which may be of any known construction, over a free pulley $10^a$, and to the winding-up roll 9. The feed-roller 10 may be operated by power or hand. I have shown a hand-wheel $15^a$, with a handle $15^b$ to drive it through the medium of a belt $10^b$.

The band or film may be maintained at a proper tension by springs or weights 11, acting on cords 12, operatively connected by gearing 14 with the supply and receiving reels 8 and 9, and the forces exerted on the band or film by these devices may be equal and opposite, so that the power required for traversing the film with a steady motion need be only sufficient to overcome the friction of the moving parts. The cords 12 may be attached to conical weight-drums on the supply and receiving reels, so as to prevent variation in the tension of the film by reason of the decrease and increase of the effective diameters of the said reels during the working of the machine.

When equal power is applied to the two weight-drums, the cords thereof may be connected together and a single spring or weight caused to act on both of the drums. The conical drums 13 may be geared to the supply and receiving reels 8 and 9 by toothed wheels 14, so as to reduce the length of the cord wound and unwound during the operation of the apparatus, and as the cord is wound upon one drum at the same rate as it is unwound from the other the weight 11 will not change its position. The apparatus may be operated by hand or by clockwork or other motor, the power being applied to the shaft of the film-operating drum—say through a pulley 15—around which passes a driving-band from a pulley $15^a$, provided with a handle $15^b$, or to the cam-shaft or otherwise, as may be found most convenient.

It will be observed on reference to Fig. 4 that the source of light L throws its beams through the film and onto the mirrors at an angle and that the reflected image is consequently thrown at an angle above the arc-light L to the binocular or equivalent arrangement L'.

Figure 5:
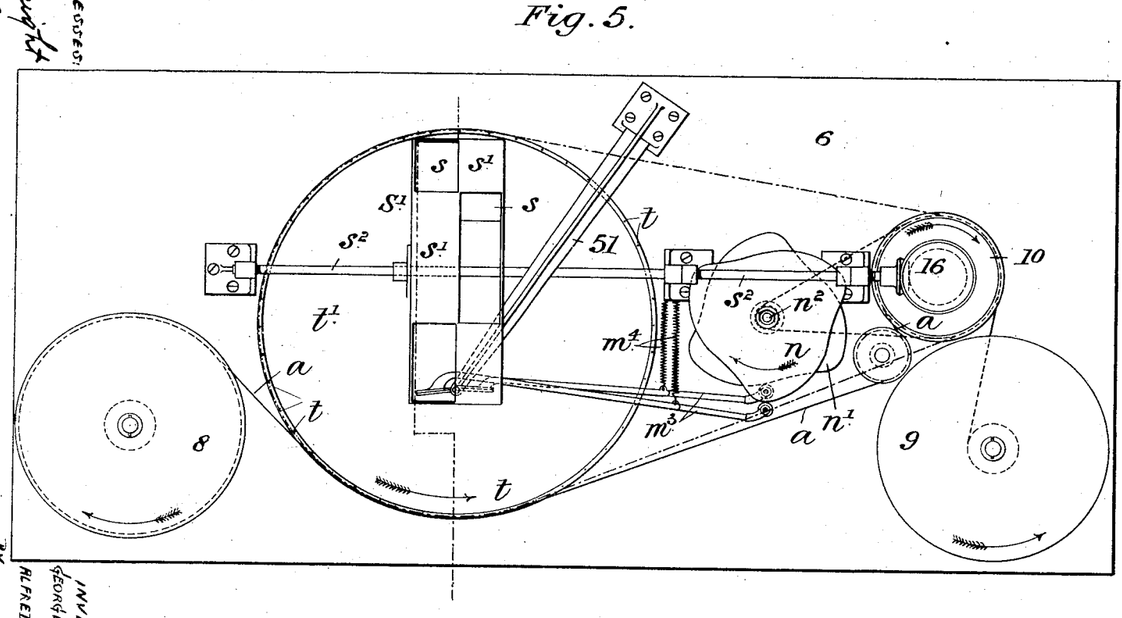
Fig. 5 is a plan, and Fig. 6 a front elevation, of a modified arrangement of the apparatus.
Figure 6:
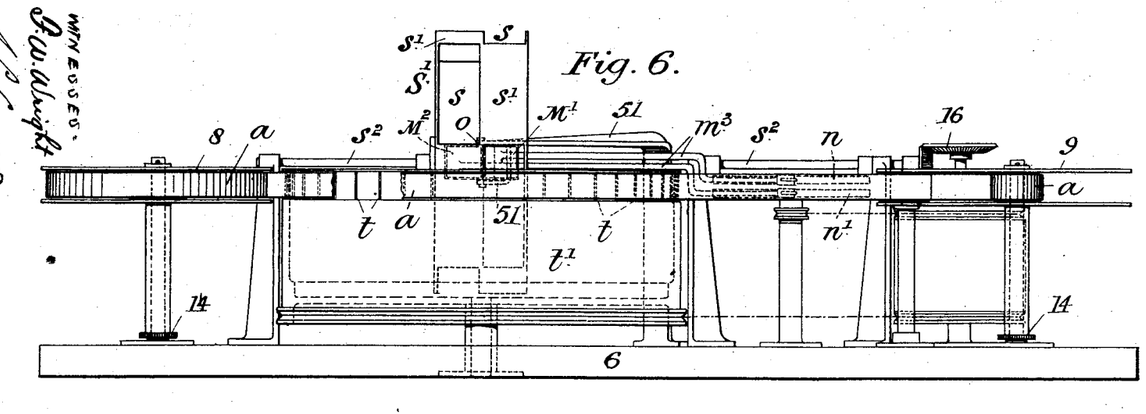
Figure 7:
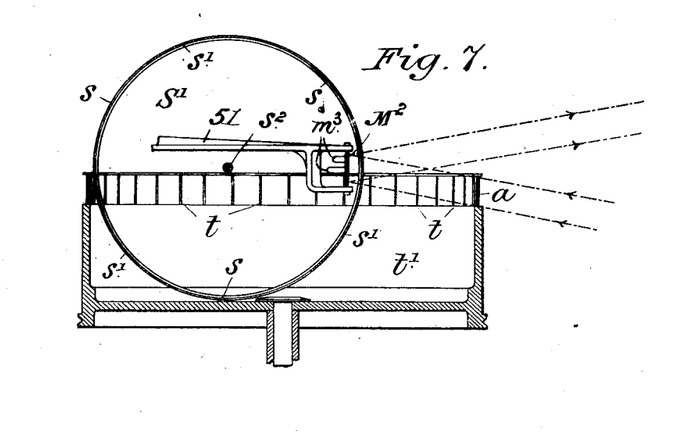
Fig. 7 is a vertical section of part of this apparatus, the section being taken on the line 7 7 of Fig. 5.
Figure 8:
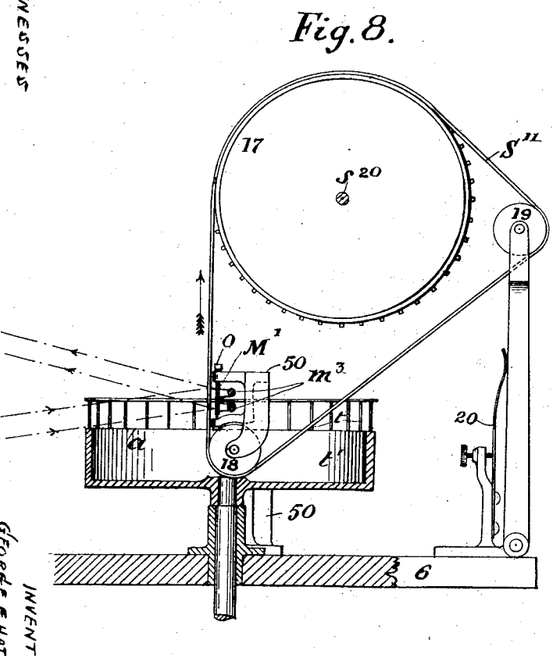
Figs. 8 and 9 are sections at right angles to each other, showing a modified arrangement of a portion of the apparatus represented in Figs. 5, 6, and 7.
Figure 9:
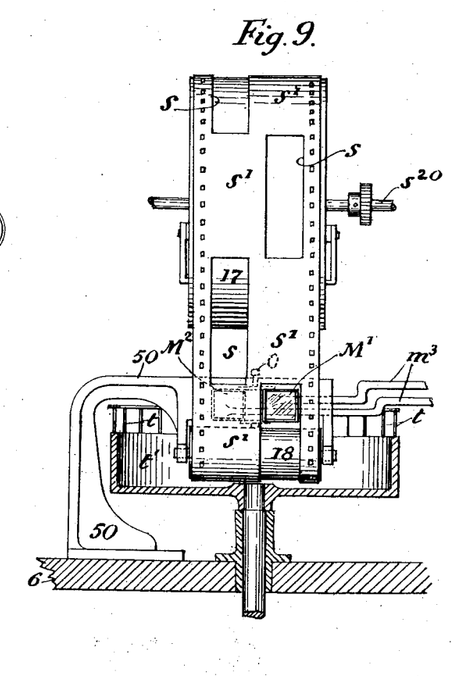

In the modification shown in Figs. 5, 6, and 7 the construction and operation of the apparatus are precisely similar to those before described, with the exception of the means for passing the films in front of the mirrors. In this construction the band or film $a$ is caused to pass over a series of pins or supports $t$, arranged in a circle and traveling at the same speed as the band or film in contact therewith, so that each section of the said band or film between any two adjacent pins forms the side of a rotating regular polygon. The pins, which are preferably black, are made as thin as possible and form part of a cage or drum $t'$, wherein they are placed at regular distances apart equal to the length of each picture plus the gap, if any, between any two adjacent pictures. The mirrors in this arrangement situated within the cage may be pivoted in a bracket 51, extending over the upper edge of the cage $t'$, and the shutter-drum S', also located within the cage, may have its shaft $s^2$, which also extends over the upper edge of the cage S', driven by bevel-wheels 16 from the shaft of the film-operating drum 10. As this construction necessarily makes it obligatory to have the shutter-drum within the rotating cage and as it sometimes is important that the shutter-drum should be of greater diameter than the cage, we have devised a means for overcoming this difficulty and have illustrated it in Figs. 8 and 9. In this modification the mirrors and cage are identical with those of Figs. 5, 6, and 7, so we have shown but enough of them to clearly illustrate this modification. In place of a cylindrical shutter-drum we mount on the frame 50 a roller below the mirrors M'. Above the cage $t$ on a shaft $S^{20}$ we mount a drum 17, preferably toothed, as shown, and to the base 6 we pivot an arm carrying a roller 19 at its upper end and acted on by a spring 20 to force the roller away from the drum 17. An endless band $S^{11}$ is mounted to pass over these three rollers, provided with openings $s$ and closures $s'$ similarly placed, as hereinbefore described, with reference to the shutter-drum of Figs. 2, 3, and 4. If desired, this band may be pierced with holes to be engaged by the teeth of the drum 17, which may be operated from any part of the apparatus desired.

Figure 10:
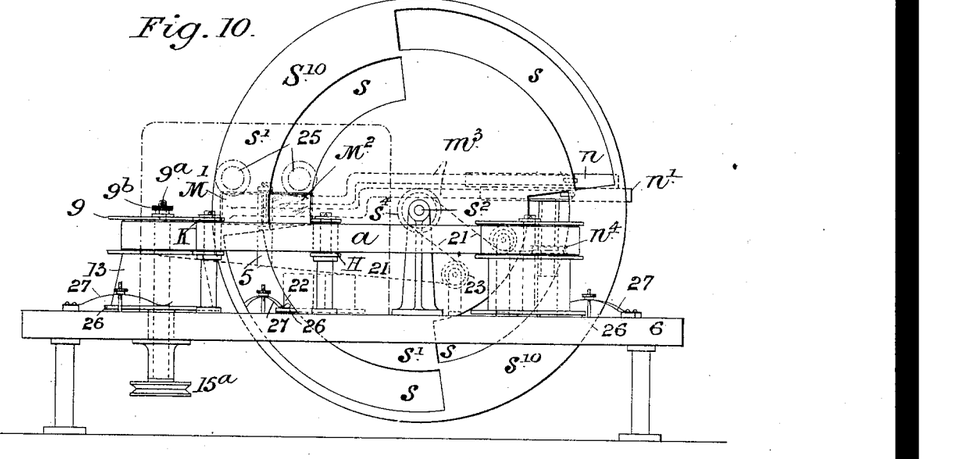
Figs. 10 and 11 are respectively a front elevation and a plan of another modification of the apparatus.
Figure 11:
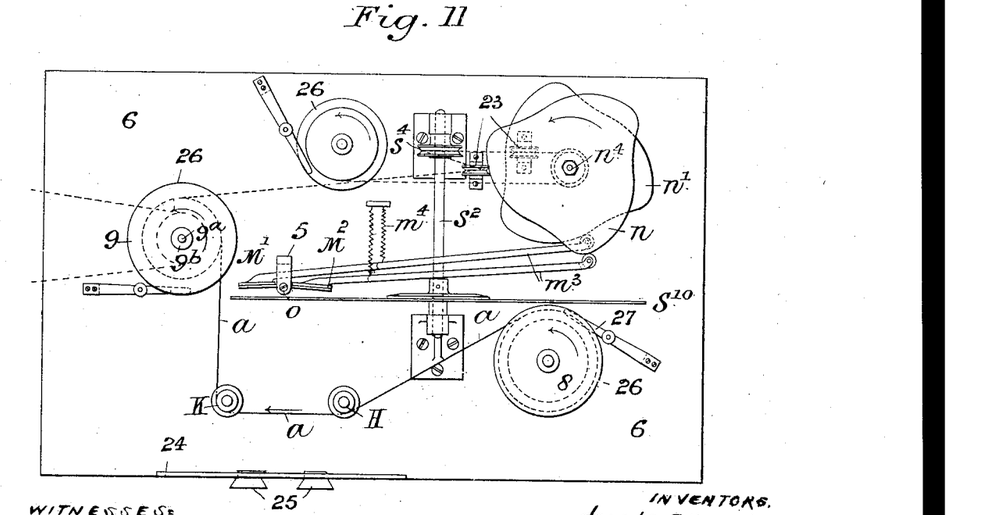

Figs. 10 and 11 show a further modification which is particularly adapted for the direct view of the reflection of a band or series of opaque pictures. In this arrangement I employ a shutter $S^{10}$ in the form of an opaque disk, mounted so as to rotate in a vertical plane close in front of the pivoted mirrors O M' O M², which latter may be arranged and operated as in the previously-described examples. Near its periphery the disk $S^{10}$ is provided with suitably-arranged openings $s$ and opaque portions $s'$ for exposing and obscuring the two mirrors in proper alternation. The band $a$ in this arrangement may pass from the supply-reel 8 directly to the two rollers H K, between which it is exposed to the mirrors, and thence directly to the receiving-reel 9, by the rotation of which latter it is caused to travel at the required speed across the exposure-field. The receiving-reel 9 may be provided with a conical drum 13, whose smallest diameter is equal to the diameter of the said receiving-drum minus the thickness of any of the picture-band wound upon it and whose largest diameter is equal to the diameter of the receiving-drum plus the thickness of all the convolutions of the picture-band. The drum 13 may, according to requirements, as hereinafter explained, be temporarily secured to or released from the receiving-reel 9 and spindle $9^a$ by means of a nut $9^b$, so that the said drum and reel may be rotated together (as if formed in one piece) or each independently of the other. To the drum 13 is attached one end of a cord 21, which is adapted to operate all the other moving parts of the apparatus, the surface of the drum being, if desired, spirally grooved, so that the cord may be wound on parts of varying diameter, and thereby caused to vary the speed of operation of the mirrors O M' O M² and shutter S' conformably with the varying speed of the picture-band, which is due to the gradual increasing of the effective diameter of the receiving-reel 9. The cord 21 passes from the last-named drum over pulleys $S^4$ and $N^4$ on the shutter and cam-shafts, respectively, and at its second end is attached to a cylindrical cord-drum 22, by which the apparatus is operated. The apparatus is preferably provided with a screen 24, having spy-holes 25, through which the picture-reflections may be viewed. The supply-reel 8, conical drum 13, and cylindrical cord-drum 22 may each be provided with an adjustable brake device, such as a flange 26, and a stationary spring 27, adapted to bear on the said flange. In the operation of the last-described apparatus the picture-band $a$ is first adjusted into proper position, which may be done by turning the supply-reel 8 and receiving-reel 9 on their respective shafts, the reel 9 being afterward secured to the shaft $9^a$ and conical drum 13 by the nut $9^b$ in the adjusted positions. The brake-pressure is then removed from the conical drum 13, so that the said drum and the reel to which it is clamped can be rotated so as to wind the picture-band across the exposure-field. When the end of the film is reached, the receiving-reel 9 is released from the drum 13, and the supply-reel 8 is rotated, so as to wind the band back into its starting position, and the cord 21 can be rewound for the next operation of the apparatus.

Figures 12, 13, 14:
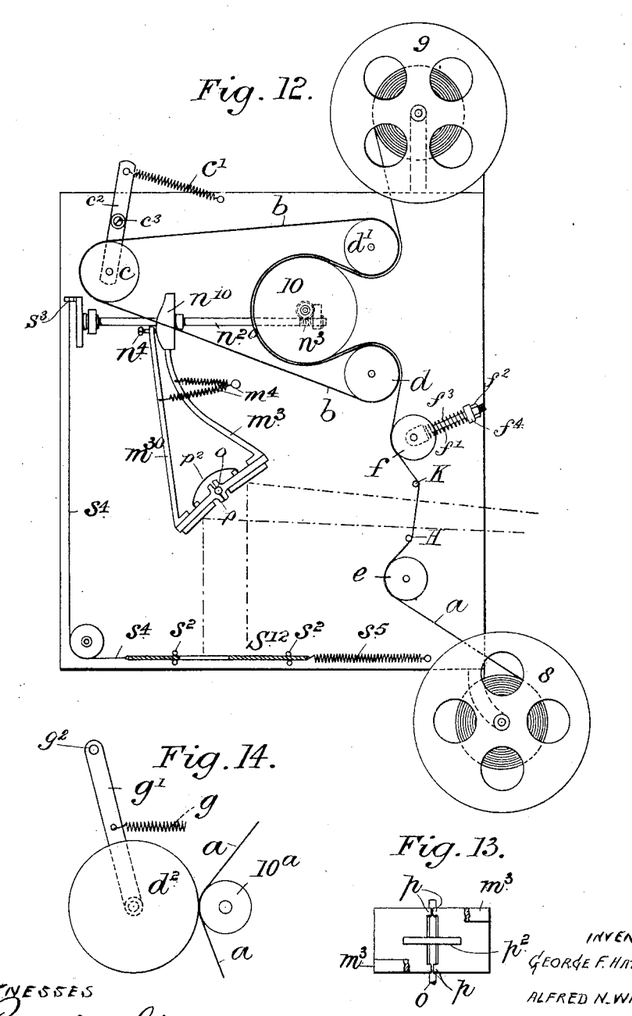
Figs. 12, 13, and 14 illustrate further modifications, as hereinafter described.

In the modifications illustrated in Figs. 12 and 13 the band of film $a$ has the necessary movement imparted to it by means of frictional contact of the endless band $b$, which passes around a series of rollers—say four, for example—as illustrated at 10, $d$ $d'$, and C, the roller C being so mounted that it is forced in a direction away from the other rollers by a spring $c'$, acting on one end of a lever $c^2$, centered at $c^3$, the other end of which lever carries the axis on which the roller C turns. The band of film $a$ passes from the reel 8 partly around a guide-pulley $e$ to the exposure-aperture between H K, from which it proceeds around the adjustable pulley $f$, hereinafter described, to the first roller $d$ of the frictional driving-gear. Here the film passes over the endless band $b$ and is nipped between the said band and the driving-roller 10, by which means the band of film $a$ is firmly held and traversed forward. From the driving-pulley 10 the band of film $a$ passes along with and over the endless band traveling around the roller $d'$ and is finally wound upon the receiving-reel 9. The rollers $d$ and $d'$ are brought as near together as may be requisite to give the necessary amount of contact with the periphery of the driving-pulley 10. The receiving-reel 9 may be driven by a cord working on a pulley secured to the said reel from the cam-shaft or other uniformly-rotating part of the machine, so as to wind up the film after it has passed through the described gripping device. The cord is sufficiently loosely fitted on the pulleys to allow it to slip should the speed of the winding-reel 9 exceed the speed at which the band of film is traversed forward.

A modified arrangement for traversing the band or film is shown in Fig. 14, in which the band $a$ is gripped directly between a roller $10^a$, mounted on the cam-shaft, and another roller $d^2$, which is pressed against the said roller $10^a$ by a spring $g$, acting on a lever $g'$, centered at $g^2$, and carrying at its other end the axis of the roller $d^2$. Sufficient pressure is obtained between the rollers $10^a$ and $d^2$ to grip the film and traverse it forward as the said rollers rotate. In this case the cam-shaft $n^2$ can be arranged vertically, or a device may be employed to twist or divert the film during its travel from a vertical position to a horizontal position. The roller $f$ is arranged to enable the pictures to be readily brought into register at starting, or during exhibition, should they become displaced, the position of the said roller $f$ is made alterable by mounting it on an axis carried by a stem $f'$, passed through a lug $f^4$ on the foundation-plate, a nut $f^2$ acting in opposition to a spring $f^3$, so that by screwing the nut $f^2$ in one or other direction the position of the roller $f$ is altered and the film is moved sufficiently to bring the pictures into proper register with the aperture between H K without the necessity of drawing the film $a$ through the apparatus. In the arrangement shown in this figure the movements of the mirrors M M' on their common center O are effected by means of a single-face cam $n^{10}$, mounted on a shaft $n^{20}$, driven by worm-gearing $n^3$ from the shaft of the driving-wheel 10. Upon the cam $n^{10}$ extensions or lever-arms $m^{30}$ are caused to press by spring $m^4$, the said extensions or lever-arms being connected with the mirrors M M', which mirrors are mounted by providing each mirror with bearing-lugs $p$, (see also Fig. 13,) which bear upon either side of the center pin O, the said mirrors being held to their bearing by a spring $p^2$ or springs. Sufficient play between the lugs $p$ is left to enable the mirrors to oscillate independently of one another when operated by the rotation of the cam $n^{10}$.

To enable the mirrors to be adjusted relatively to each other, one of the lever-arms or extensions $m^{30}$ is provided with a screw $n^4$, or other suitable means may be arranged by which the angle of one of the mirrors can be altered. Of course it will be obvious that prisms could be used in place of the mirrors.

To alternately shut off and expose the respective mirrors M M', a reciprocating or oscillating shutter or changer $S^{12}$ is employed, which is moved in guides $s^2$ in front of the mirrors by means of a crank $s^3$ on the end of the cam-shaft $n^{20}$. The crank $s^3$ is connected by a cord $s^4$ with the shutter $s'$, so that the movement of the crank causes the shutter to be pulled in one direction, its return being effected by a spring $S^5$.

Although, as shown in Fig. 12, the reflected rays pass out at an angle to the incident rays on the same plane, it will be readily understood that the present improvements are equally applicable to the case in which the reflected rays pass back on the same vertical plane, the source of light being then below the film and the reflected image from the mirrors passing over the band of film.

It will be obvious that by employing a suitable arrangement of lenses the before-described apparatus may be employed for taking cinematographic pictures as well as for exhibiting such pictures, in which case a suitable backing would be applied behind the film at the part at which it is brought opposite to the mirrors, and the said machines would be inclosed in light-tight cases.

We do not limit ourselves to the precise details for carrying out this invention, as it will be evident that they can be varied without departing from the general nature of the invention. For example, we may arrange the apparatus so that the film of pictures is traversed forward by frictional contact with an endless band instead of using sprocket-wheels to engage in perforations in the film and the mechanical arrangements for operating the oscillating mirrors, and also the shutter or changer for alternately exposing and obscuring the mirrors at the proper intervals of time may be modified.

We claim as our invention—

1. In cinematographic apparatus, the combination of a film having successive pictures in a single line and means for traversing the film with two plane mirrors pivoted together like the leaves of a book and means for oscillating said mirrors alternatively, whereby one mirror acts upon every other image and the other mirror upon the alternate images, substantially as described.

2. In cinematographic apparatus, the combination of a film and means for traversing the film with two plane mirrors pivoted together like the leaves of a book and means for oscillating them with relation to each whereby one mirror acts upon every other image and the other mirror upon the alternate images.

3. In cinematographic apparatus, the combination of a film and means for traversing the film with two plane mirrors pivoted together like the leaves of a book and means for oscillating them with relation to each other whereby one mirror acts upon every other image and the other mirror upon the alternate images and a shutter arrangement whereby the said mirrors are thrown out of optical use before and during the return portion of their oscillating movements, substantially as described.

4. In cinematographic apparatus, the combination of a film and means for traversing the film, with two plane mirrors pivoted together like the leaves of a book, arms for said mirrors and a cam to operate the arms to oscillate the mirrors, means for keeping the film in proper tension as it is traversed and a shutter, all substantially as described.

5. A cinematographic apparatus having a single strip of film and a single line of pictures thereon, means for advancing it and two oscillating mirrors hinged together like the leaves of a book, in combination with a shutter adapted to pass in front of the mirrors, having openings and closures and means for operating said shutter and mirrors, substantially as described.

6. A cinematographic apparatus having a single strip of film and a single line of pictures thereon, oscillating reflecting means, lever-arms $m^3$ and cams, a shutter adapted to be passed in front of the mirrors, and a shutter-drum and shaft, a driving-pulley 10, and means for operating the film-feed, the cams and the shutter all from said pulley, substantially as described.

7. A cinematographic apparatus having oscillating mirrors, lever arms and cams and a shutter, in combination with a single strip of film, rollers to hold the rolled-up film and conical driving-pulleys to operate the rollers, and a cord between the pulleys under tension, as and for the purpose described.

8. In cinematographic apparatus, the combination of a film having successive pictures in a single line and means for traversing the film, with two plane pivoted mirrors, means for oscillating said mirrors alternatively, whereby one mirror acts upon every other image and the other mirror upon the alternate images.

9. In cinematographic apparatus, the combination of a film having successive pictures in a single line and means for traversing the film, with two plane pivoted mirrors and means for oscillating them with relation to each other, whereby one mirror acts upon every other image and the other mirror upon the alternate images and a shutter arrangement whereby the said mirrors are thrown out of optical use during the return portions of their respective oscillating movements, substantially as described.

In testimony whereof we affix our signatures in presence of two witnesses.

GEORGE FREDERIC HATTON.
ALFRED NORTH WHITEHEAD.

Witnesses as to George Frederic Hatton:
ENY BURNS,
J. B. CAGNETZ.

Witnesses as to Alfred North Whitehead:
WILLIAM GERALD REYNOLDS,
PERCY READ GOLDRING.